Figure 1:
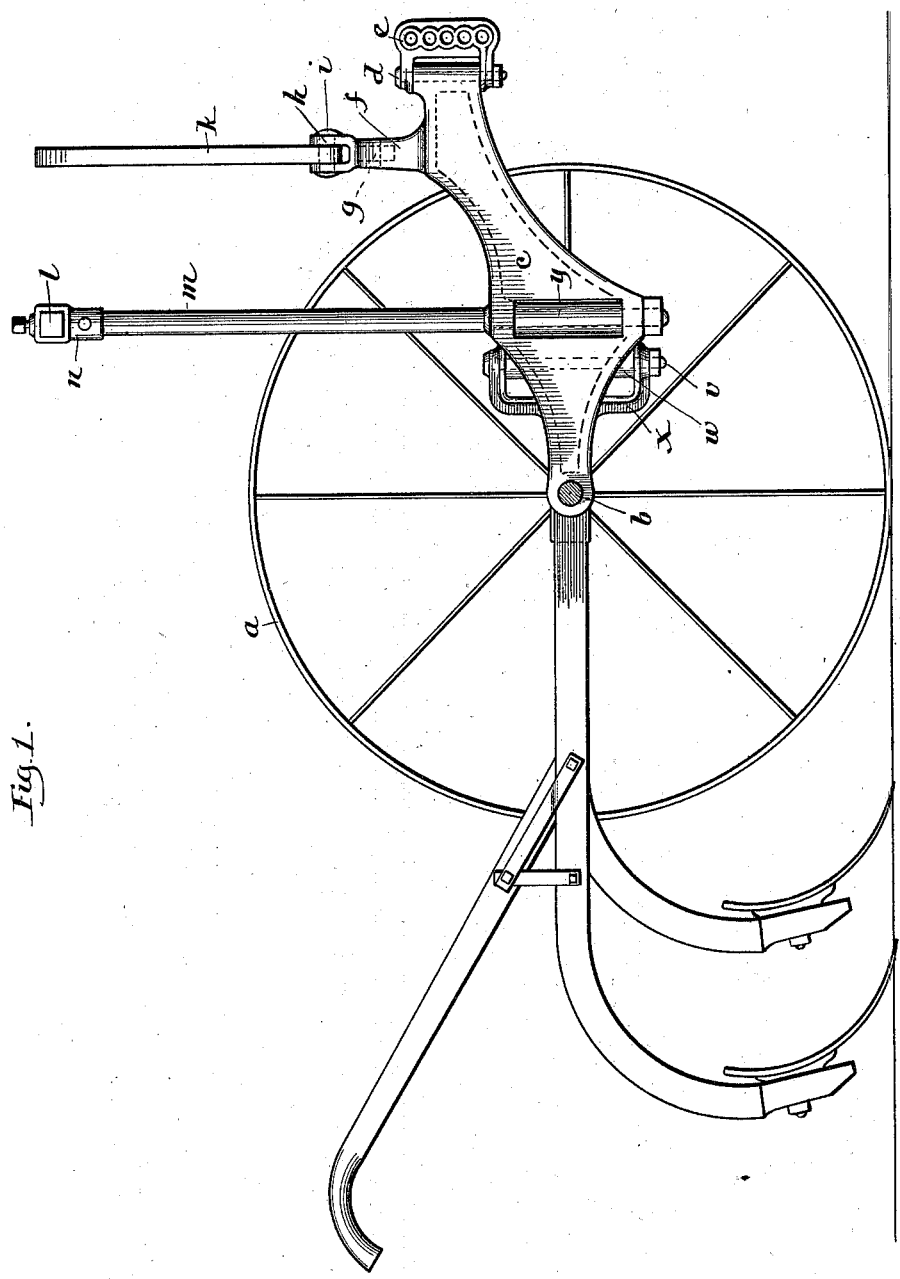

(No Model.) 5 Sheets—Sheet 1.

W. SOBEY.
WHEEL CULTIVATOR.

No. 558,995. Patented Apr. 28, 1896.

Witnesses:
Fred Geelar
Alberta Adamick

Inventor:
Wm Sobey
By Peirce & Fisher
Attorneys.

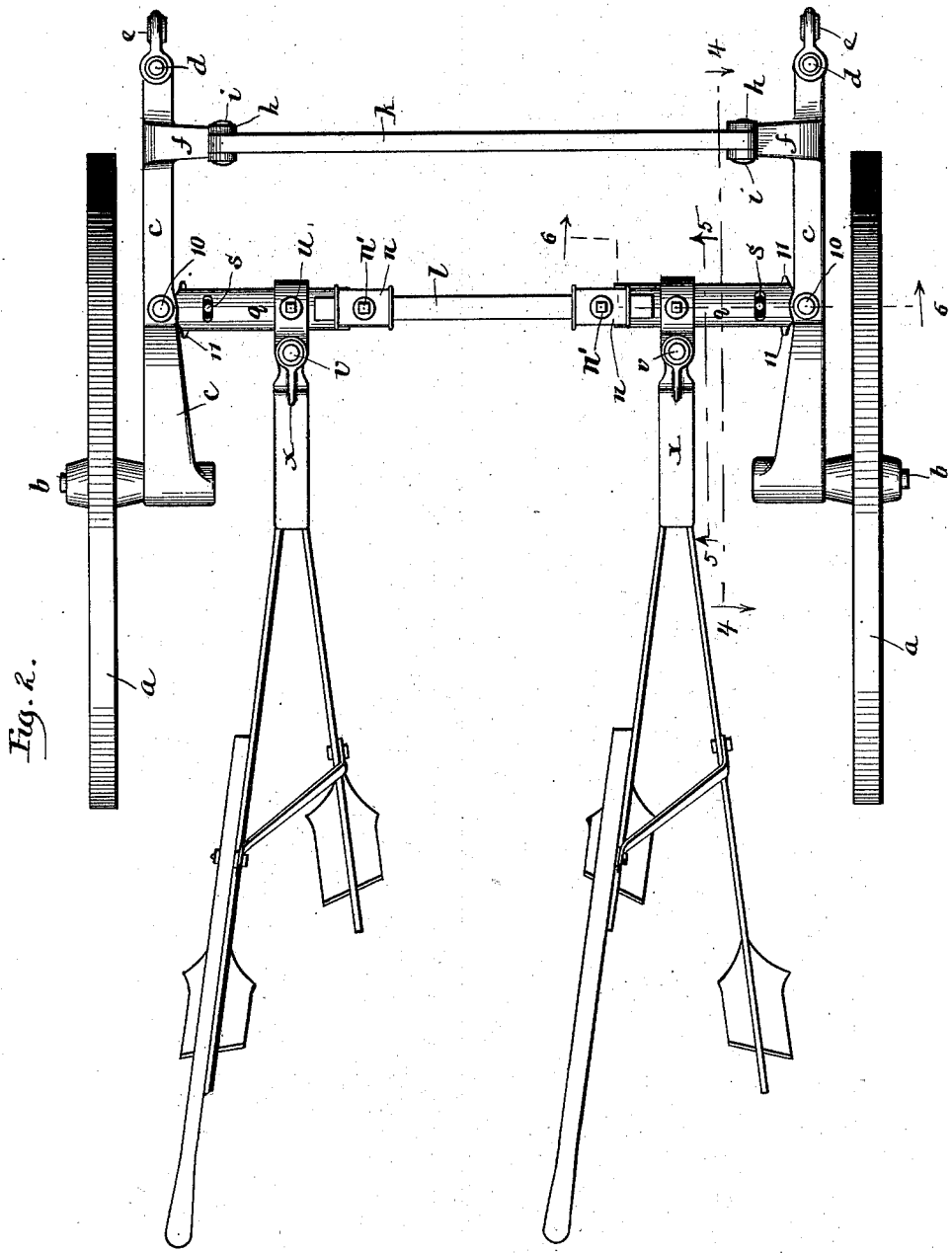

(No Model.) 5 Sheets—Sheet 3.
W. SOBEY.
WHEEL CULTIVATOR.
No. 558,995. Patented Apr. 28, 1896.
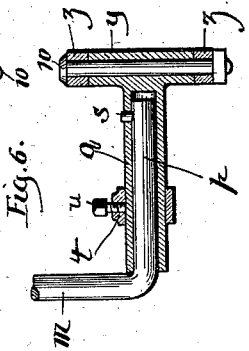
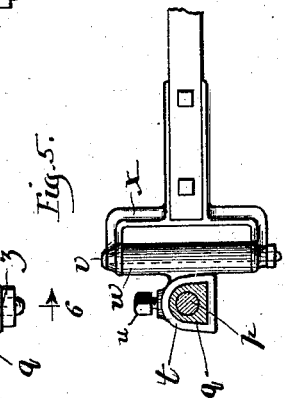
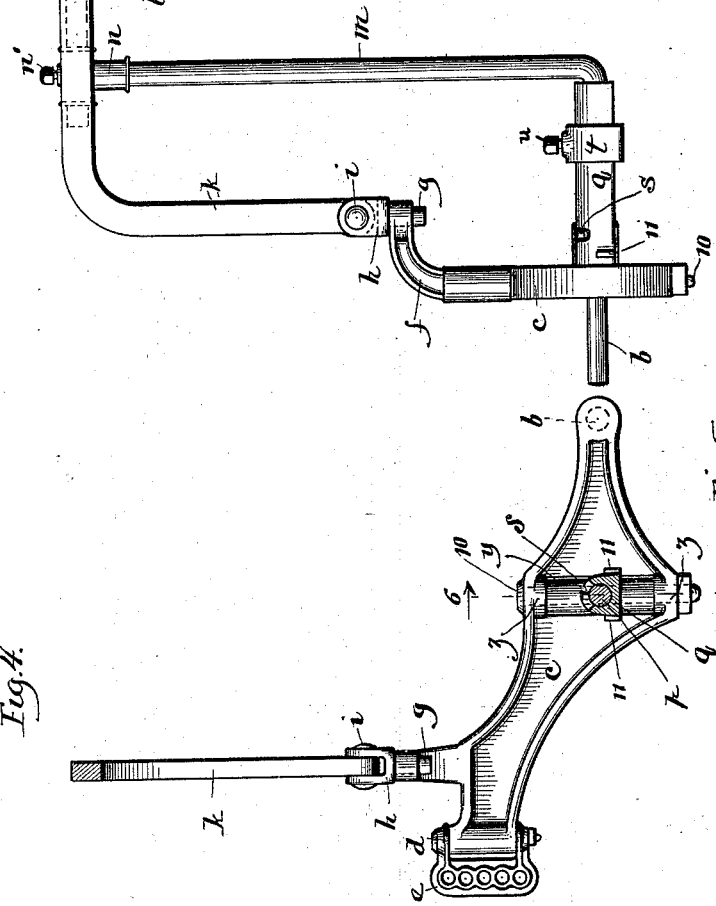
Witnesses:
Fred Gerlach
Alberta Adamick
Inventor:
Wm Sobey
By Peirce & Fisher
Attorneys.

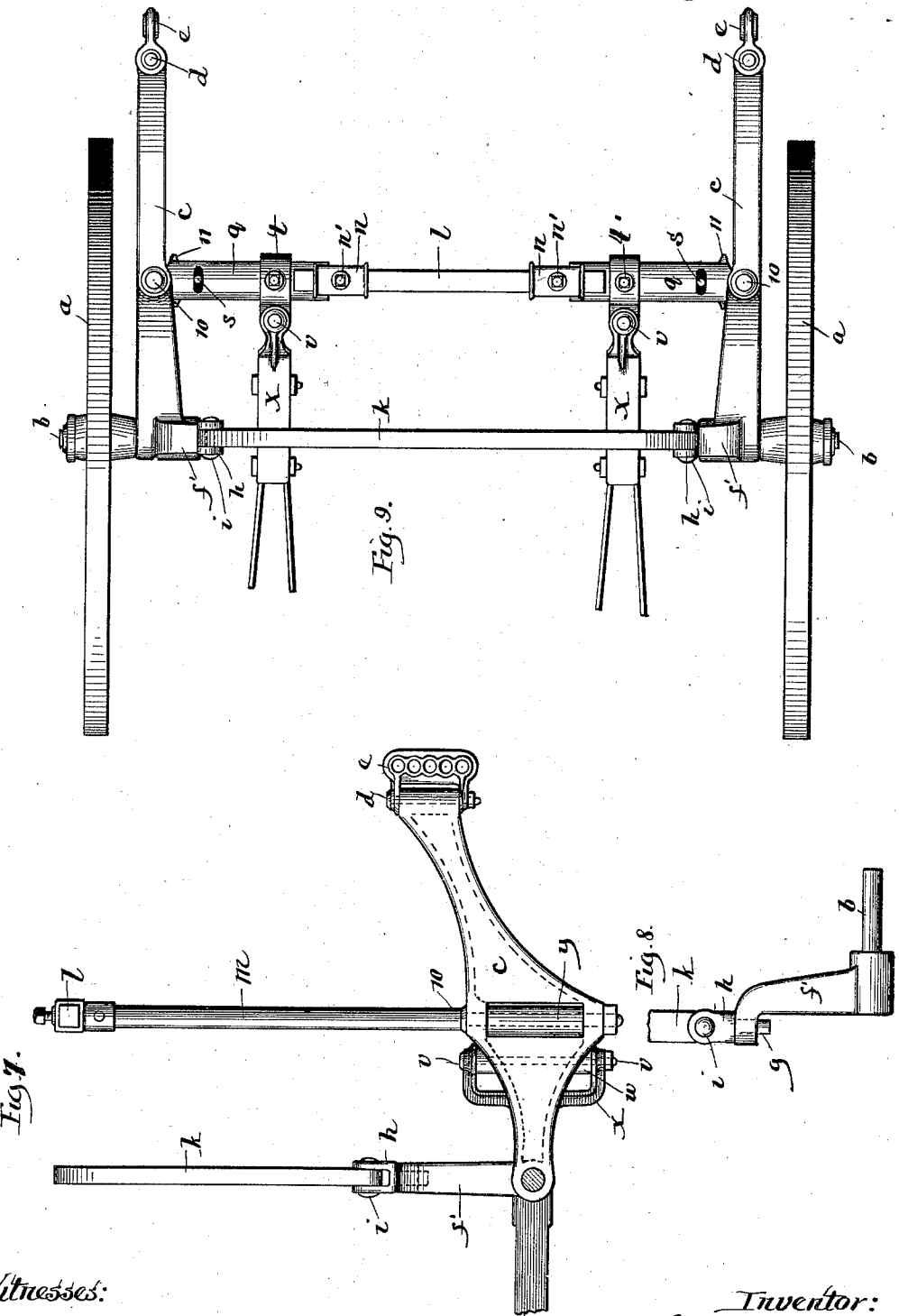

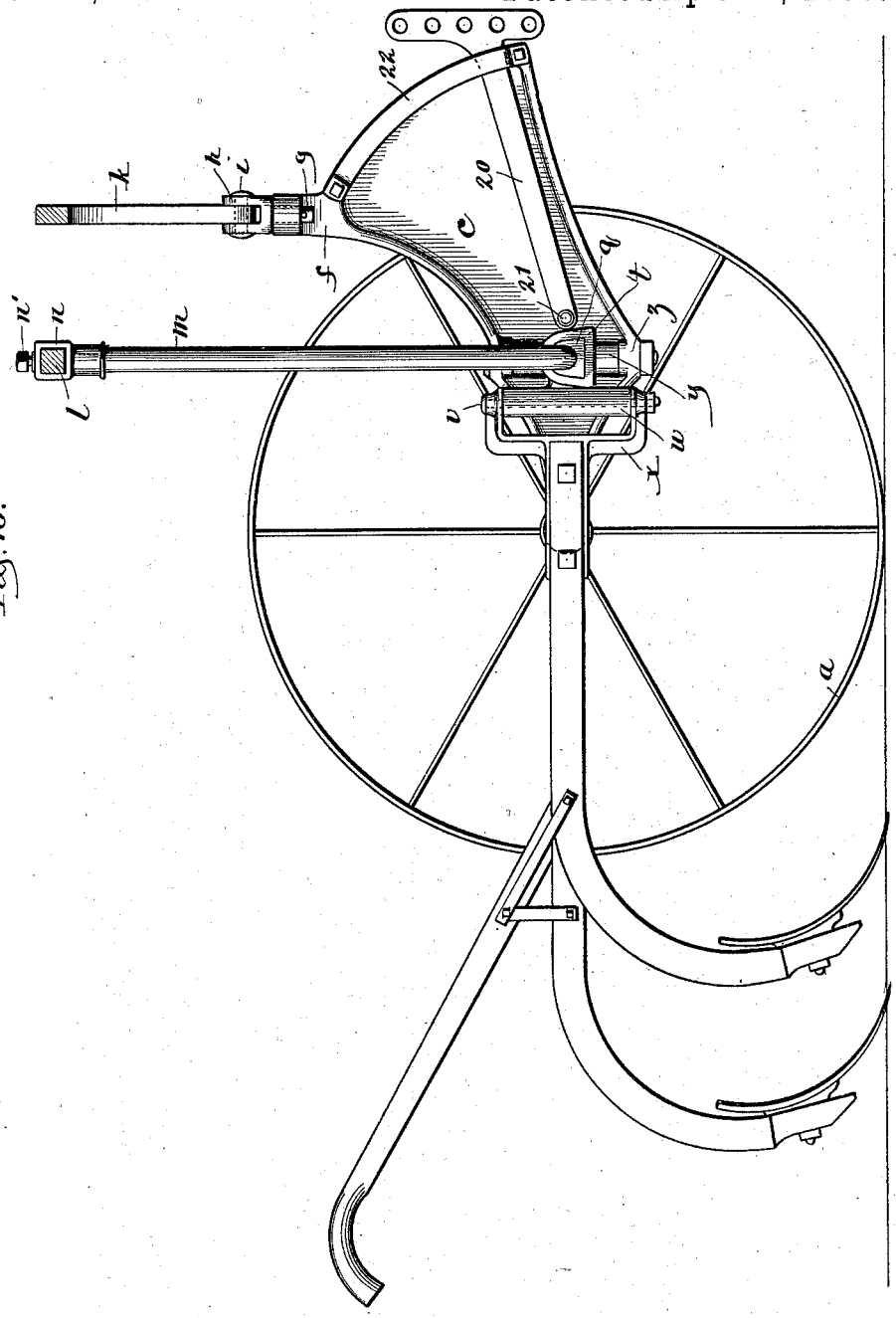

UNITED STATES PATENT OFFICE.

WILLIAM SOBEY, OF RACINE, WISCONSIN, ASSIGNOR TO THE J. I. CASE PLOW WORKS, OF SAME PLACE.

WHEEL-CULTIVATOR.

SPECIFICATION forming part of Letters Patent No. 558,995, dated April 28, 1896.

Application filed October 30, 1895. Serial No. 567,355. (No model.)

*To all whom it may concern:*

Be it known that I, WILLIAM SOBEY, a resident of the city and county of Racine, State of Wisconsin, have invented certain new and useful Improvements in Wheel-Cultivators, of which I do declare the following to be a full, clear, and exact description.

The invention relates to cultivators in which the system of machine parts is sustained from the wheel-spindles, the weight being distributed about the spindle-centers in such wise that on raising one or both of the gang-beams at the rear the several elements of structure or the parts thereof in advance of the spindles will measurably serve as a counterpoise to balance the gang-beams and so far to relieve the operator.

The improvements are more especially directed to wheel-cultivators wherein a guiding-tongue may be omitted. The draft-arms for the team are attached to the wheel-spindles and are swiveled forward to the main arch-bar, while at front or rear of said arch-bar a cross-evener extends between the draft-arms and is pivoted oppositely thereto in position substantially parallel to the arch-bar. By such provision one horse may travel in advance of its fellow, or the carrying-wheels be free to shift laterally in unison, to a limited extent, and thus track behind the team, while the cultivator-shovels remain unaffected and hold to a true course along the row.

The exact nature of the invention will appear at large from the description in detail to follow and will be pointed out more distinctly by claims at the end of the description.

In the drawings which accompany, like parts of structure bear like designation throughout.

Figure 1 is a view of the improved machine in side elevation, the "off" carrying-wheel being removed and the cross-evener shown in advance of the main arch-bar. Fig. 2 is a general plan view of the same; Fig. 3, a view in front elevation thereof; Fig. 4, a section view at line 4 4, and Fig. 5 a sectional elevation at line 5 5 of Fig. 2; Fig. 6, a detail section at line 6 6 of Figs. 2 and 4; Fig. 7, a detail elevation view displaying the cross-evener in place at the rear of the main arch-bar; Fig. 8, a detail view at the back of the draft-arm, Fig. 7, showing the spindle-mount for the carrying-wheel and the joint connection between the cross-evener and the draft-arm; Fig. 9, a plan view of the machine, Fig. 7, wherein the cross-evener is back of the main arch-bar; Fig. 10, a side view of a machine such as shown by Fig. 1, except that the clevis or hitch bar is pivotally secured toward the rear end to the draft-arm, and remains practically unaffected by the vertical shift of said arm turning from the wheel-spindle as a center.

The carrying-wheels $a$ are furnished with spindle-mounts $b$, which ordinarily are secured in rigid fashion at their inner ends to the draft-arms $c$. Said arms $c$ extend forward and slightly upward from the spindles $b$ in near relation to the wheels, and at the front end in advance of the wheels each arm has secured thereto by eyebolt $d$ or like expedient the clevis $e$, to which the team-hitch is applied. Lateral brackets $f$ project rigidly inward from the opposite draft-arms $c$ and terminate in eye-seats to loosely receive the shanks $g$ of the companion couplers $h$. Pivoted to said couplers, as at $i$, is the cross-evener $k$, which thus extends between the draft-arms to insure the unison play thereof.

Swiveled to the draft-arms $c$ in front of wheel-spindles $b$ is the main arch-bar. Said bar is preferably made of two upright L-pieces $m$, united at their upper terminals to the transverse tie $l$ by means of the familiar angular couplings $n$. Set-screws $n'$ at couplings $n$ secure the tie $l$ and L-pieces $m$ rigidly together in assigned position. The outer or horizontal member $p$ of each L-piece $m$ loosely receives the box $q$, which, by pin-and-slot joint $s$ or like expedient, has a slight rotary play upon said extension $p$. The boxes $q$ are conveniently of inverted-U form, and at assigned position each box rigidly sustains a collar $t$ for the gang-beam, the collar being held in place by set-screw $u$. At the rear and cast in piece with collar $t$ is a long bearing $w$, through which passes a pivot-bolt $v$ for the forked end $x$ of the gang-beam. Under control of the operator each beam is free to swing laterally about its pivot $v$ and has besides a slight vertical play (in unison movement with collar $t$ and box $q$) about the arch-bar extension $p$, so far as the pin-and-slot joint $s$ will permit.

At its outer end box $q$ is expanded to constitute an elongated bearing $y$. Through said bearing and the corresponding eyes $z$ on the draft-arm $c$ passes a pivot-bolt 10. By such provision the arch-bar is swiveled near its outer ends to the draft-arms. Said arms $c$, together with the carrying-wheels $a$, are thus free to swing laterally about bolts 10 in limited degree without shifting the arch-bar or the gang-beams, which latter remain in true course at the sides of the row. Stops 11, Fig. 2, at the sides of box-coupler $q$ contact at front and rear with draft-arm $c$ to determine the lateral play thereof about its pivot-bolt 10. When one gang-beam alone is raised during field operations, the tendency is for the carrying-wheel nearest thereto to swing inward at its rear, turning with the draft-arm about pivot-bolt 10 on the main arch-bar as a caster-pivot. Hence it is that cross-evener $k$ comes into play at this juncture, and in addition to other functions holds the near wheel from "castering," even though the gang-beam next thereto be running at higher elevation than its fellow beam.

The structure displayed by Figs. 7 and 9 does not vary essentially from what has already been described, and differs merely in providing the mount for the cross-evener $k$ on lateral brackets $f'$ at the draft-arms $c$ in rear of the main arch-bar $m$ instead of being at the front thereof. In such new relation the weight of the cross-evener and brackets is not applied with the same advantage as an aid for counterpoise, but otherwise the action of the cross-evener remains unchanged.

Fig. 10 exhibits a machine structure substantially the same as that shown by Figs. 1 to 6, but instead of the familiar clevis $d$ $e$ there is provided a clevis-bar 20, pivoted, as at 21, to draft-arm $c$ in near relation to the axis $p$ $q$ for the forward end of the gang-beam. A strap 22 holds the clevis-bar alined to the face of the draft-arm $c$. It is seen that said clevis-bar applies the power of the team practically at the front end of the gang-beam, while the line of draft, and hence the running depth of the shovels, is less affected, owing to pivot connection 21 for the clevis-bar 20. If the hitch were made directly at the front of draft-arm $c$, Fig. 1, the arc described by the hitch-point, on turning the system about wheel-spindles $b$, is much greater than the arc described by hitch-pivot 21, Fig. 10, and for this reason the use of clevis-bar 20 causes less disturbance to the line of draft or, conversely, exposes the operator to less resistance from the team in shifting his gang-beams than if the hitch were farther forward from the spindles—e. g., directly at the front of draft-arms $c$.

The details of structure can be varied according to the skill of the mechanic without departing from the spirit of the invention.

Having thus described my invention, what I claim as new, and desire to secure by Letters Patent, is—

1. The combination with the carrying-wheels, of the draft-arms united by spindles thereto and projecting forward therefrom, the cross-evener oppositely jointed to said draft-arms, the main arch-bar swiveled to said arms and the gang-beams carried by said arch-bar and having a limited vertical play thereon, substantially as described.

2. The combination with the carrying-wheels, of the draft-arms united by spindles thereto and projecting forward therefrom, the cross-evener oppositely jointed to said draft-arms, the main arch-bar swiveled to said arms between the wheel-spindles and the cross-evener, and the gang-beams carried by said arch-bar and having a limited vertical play thereon, substantially as described.

3. The combination with the carrying-wheels, of the draft-arms united by spindles thereto and projecting forward therefrom, the cross-evener oppositely jointed by universal couplings to said draft-arms, the arch-bar swiveled to said arms, and the gang-beams carried from the arch-bar extensions by box-couplers united thereto by pin-and-slot connections, to permit a limited vertical play, substantially as described.

4. The combination with the carrying-wheels, of the draft-arms united by spindles thereto and projecting forward therefrom, the cross-evener oppositely jointed by universal couplings to said draft-arms, the arch-bar swiveled to said arms between the wheel-spindles and the cross-evener, and the gang-beams carried from the arch-bar extensions by box-couplers united thereto by pin-and-slot connections, to permit a limited vertical play, substantially as described.

WILLIAM SOBEY.

Witnesses:
ALBERT DRUSE,
LOUIS E. ROGGENBAN.